March 17, 1964
G. A. DOTTO
3,125,187
FLUID OPERATED, BRAKE APPLYING AND RETRACTING CYLINDER
AND PISTON UNIT, INCLUDING FLUID OPERATED
AUTOMATIC SLACK ADJUSTER
Filed Oct. 28, 1960
2 Sheets-Sheet 1
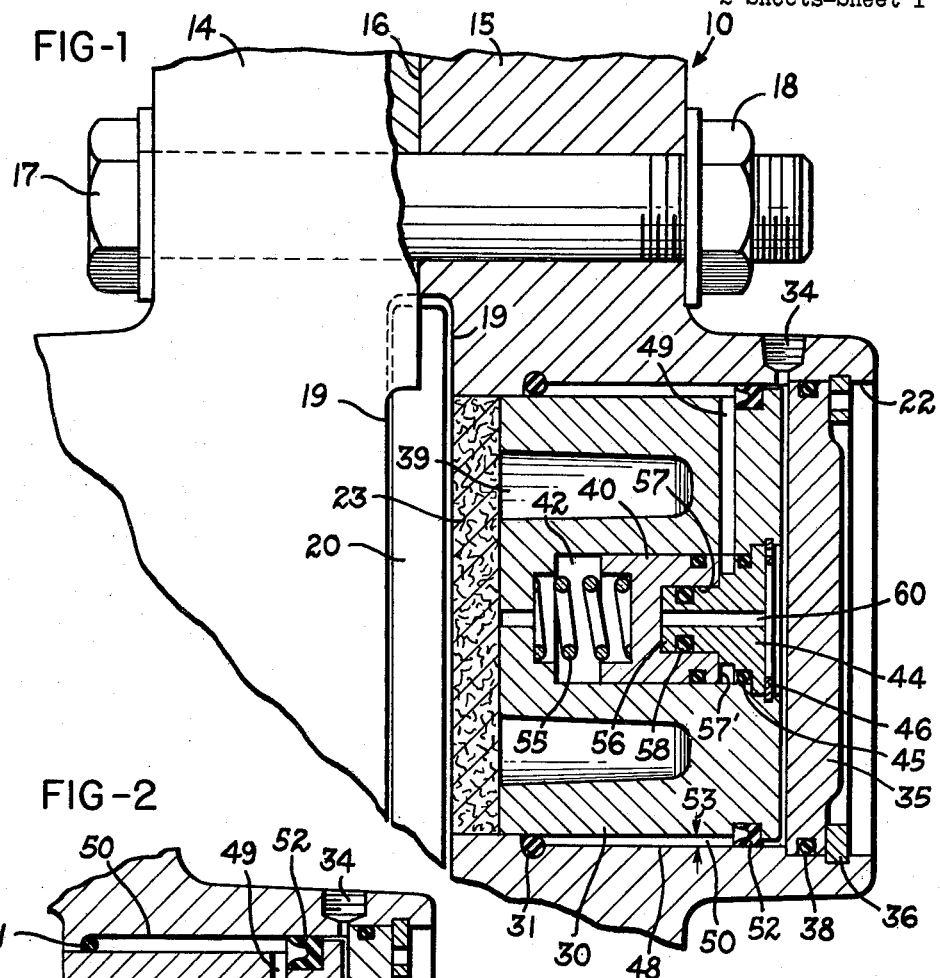
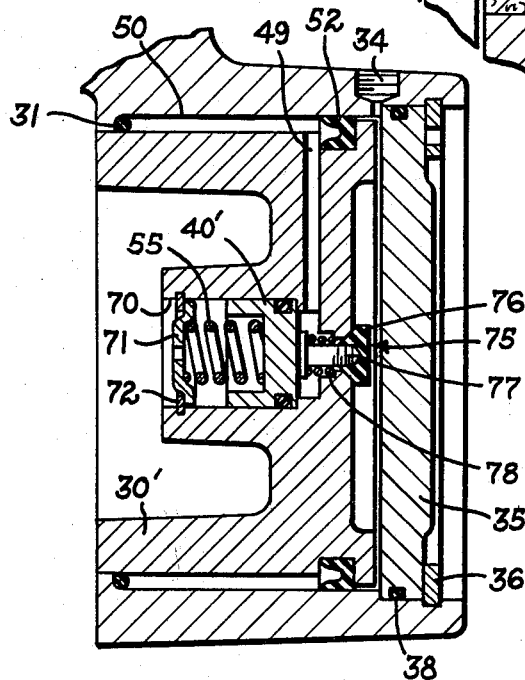
INVENTOR.
GIANNI A. DOTTO
BY
Marchal, Biebel, French & Bugg
ATTORNEYS

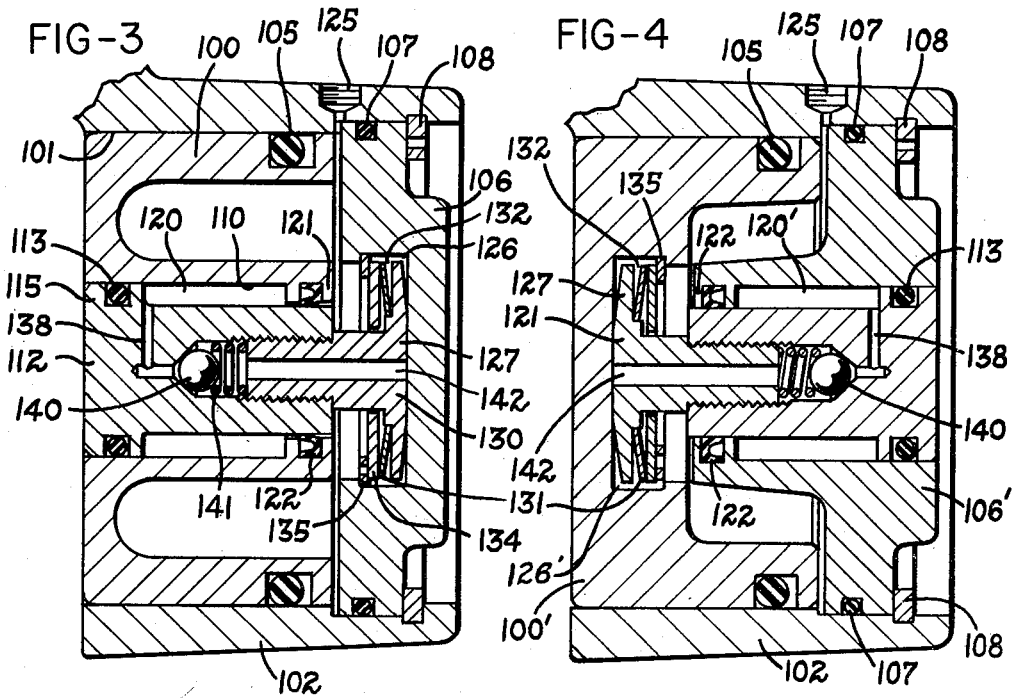
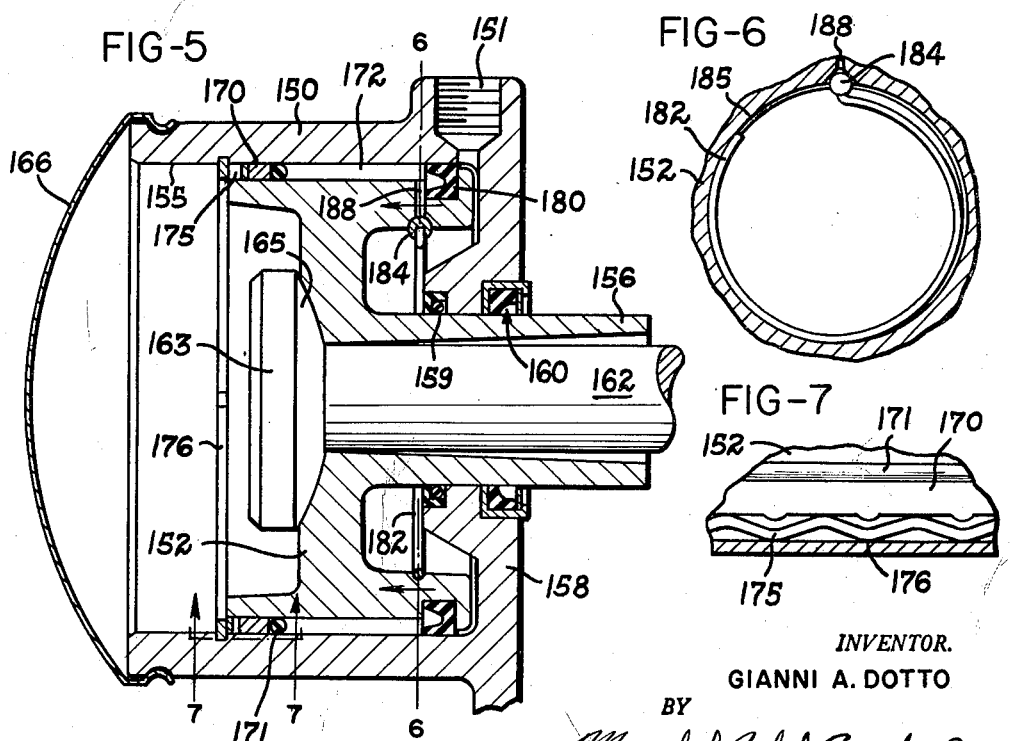
INVENTOR.
GIANNI A. DOTTO

United States Patent Office 3,125,187
Patented Mar. 17, 1964

3,125,187
FLUID OPERATED, BRAKE APPLYING AND RETRACTING CYLINDER AND PISTON UNIT, INCLUDING FLUID OPERATED AUTOMATIC SLACK ADJUSTER
Gianni A. Dotto, Dayton, Ohio, assignor to The Dayton Steel Foundry Company, Dayton, Ohio, a corporation of Ohio
Filed Oct. 28, 1960, Ser. No. 65,806
8 Claims. (Cl. 188—152)

This invention pertains to force applying and automatic retracting devices and more particularly to such devices for the application of a force under the influence of fluid pressure and retraction upon the release of such pressure, as employed in hydraulic brakes and the like.

The force application and retraction devices of this invention include a primary force applying piston and a secondary piston for the automatic maintenance of a retraction gap. Reverse movement of the primary piston is effected to compensate for overtravel, and for change of dimension of the parts due to heat and wear. This invention effects such automatic compensation and adjustment through a fluid-operated repositioning arrangement, operating by positive forces generated in the fluid system through the secondary piston, and operating immediately upon the release of the pressure without any frictional connection between the secondary piston and the primary piston or the body of the unit.

Therefore, this invention eliminates the drag seats, frictional couplings, and drag pins which are commonly employed in the positioning of a primary force applying piston. Thus, the invention eliminates a troublesome difficulty with such devices which are dependent upon the establishment and maintenance throughout a service life of a particular frictional coupling which is, in turn, dependent upon the maintenance of a coefficient of friction.

The primary piston of this invention is the principal force applying agent. A secondary piston is arranged for relative movement within limits which define the gap through which the primary piston is retracted by the secondary piston from its operating or force applying position. The invention includes a fluid chamber established between the primary and secondary pistons which is pressurized upon the application of fluid pressure to the unit and which is arranged to maintain at least a portion of this pressure upon release. The pressure applied to this chamber by a source of actuating pressure moves the secondary piston to take up the retraction gap. The secondary piston area is correlated with the force of the retraction spring and the cross-sectional area of the fluid chamber between itself and the primary piston, and is effective to hold the secondary piston in such moved position during a portion of the release of fluid pressure. This permits the body or housing and the primary piston to return to a zero clearance position with the elimination of any overtravel of the primary piston, and the compensation for expansion of the parts due to heat, etc.

With the further decay of the fluid pressure, the secondary piston moves or returns to its "at rest" position under the influence of a retraction spring and operates through this chamber to retract the primary piston by an amount equal to the retraction gap.

The invention is preferably operated by hydraulic liquid and is subsequently described with reference to specific embodiments designed for operation with hydraulic liquid. However, it is understood that the principles here involved may be applied with facility to a retraction unit for use with pneumatic systems. Also, the embodiments described herein have particular application in brakes, but it is understood that they may be used with clutches and other devices where a force is to be applied by a unit capable of retraction to maintain a desired clearance.

It is therefore a principal object of this invention to provide a force application and retraction unit including primary and secondary pistons operable to provide compensation by positive forces and resulting in the elimination of a friction drag connection of the secondary piston.

A further object of this invention is to provide a retraction unit as outlined above which includes a secondary piston operable to establish a retraction gap with each application and release of pressure and without the necessity of "pumping" the pressure.

Yet another object of this invention is the provision of a pressure operated force application and retraction unit which has a primary piston movable in an infinite number of intermediate positions to compensate for wear of a lining and which is, in each cycle of operation, repositioned through a retraction gap by a secondary piston operating on the primary piston through a fluid chamber of variable volume.

A still further object of this invention is the provision of a force application and retraction unit as outlined above which is characterized by dependable and uniform operation over a long service life and which is not dependent upon the maintenance of a stable coefficient of friction for operation.

Other objects and advantages of the invention will be apparent from the following description, the accompanying drawings, and the appended claims.

In the drawings:

FIG. 1 is a view partially in section of one of the retraction units of this invention as applied to a disk brake;

FIG. 2 is a sectional view of a modified form of the unit of FIG. 1;

FIG. 3 is another sectional view of a further embodiment of this invention;

FIG. 4 is a modified form of the unit of FIG. 3;

FIG. 5 is a sectional view of another embodiment of the invention;

FIG. 6 is a fragmentary section along the line 6—6 of FIG. 5; and

FIG. 7 is another fragmentary section along the line 7—7 of FIG. 5.

Referring to the drawings, which illustrate preferred embodiments of the invention, a unit constructed according to the teachings of this invention is shown in FIG. 1 as applied in a disk brake including a relatively fixed body member or housing 10. The housing 10 may be divided into a left-hand body section 14 and a right-hand body section 15 which sections are held in abutting relation to each other along their adjoining faces or parting line 16 by a bolt 17 and nut 18. The body sections 14 and 15 have cooperating relieved portions 19 forming a gap through which a brake disk 20 is arranged to rotate.

A retraction unit is shown in FIG. 1 as being received within a generally cylindrical cavity 22 formed in the body section 15 and arranged to apply a braking force on the disk 20 through a pad of friction material 23. It is common in brakes of this type to employ a pair of such hydraulic force application units, one in each of the body sections, for the simultaneous application of friction material to opposite sides of the disk, although one such unit may be employed to apply force to an axially movable disk, with a fixed pad of friction material received in the opposite body section.

The hydraulic retraction unit of FIG. 1 includes a primary piston 30 axially movably positioned in the cavity 22 and arranged to apply braking force to the pad 23. The escape of hydraulic fluid by the piston 30 is prevented by an O-ring 31 received in a cooperating annular groove formed in the body section 15.

Means for applying a source of hydraulic fluid under pressure to the primary piston 30 includes a fluid pressure opening 34 tapped within the wall of the body section 15 and opening into the fluid pressure space behind the piston 30. The cylindrical cavity 22 is closed and sealed by a closure or end plate 35 held in place by a snap ring 36 and including an O-ring 38 forming a seal with the wall of the cavity 22. The primary piston 30 may be recessed or relieved as indicated at 39 for the purpose of reducing weight and improving cooling.

A secondary piston 40 is slidably received within an axial cylindrical cavity 42 formed within the primary piston for limited movement therein. The open end of the cavity 42 is closed and sealed by a plug 44 and an O-ring 45 which is retained by a snap ring 46.

The body section 15 is formed with an annular enlargement 48 which communicates with the side of the secondary piston 40 adjacent the plug 44 through a drilled radial passageway 49 formed in the primary piston 30. The enlargement 48, the passageway 49, and the space, if any, between the secondary piston 40 and the plug 44 define a fluid space or chamber 50 of variable volume between the primary and secondary pistons.

One way fluid passage or valve means providing for the flow of hydraulic fluid from the inlet 34 to the chamber 50 includes a V-ring 52 carried by the primary piston 30 in sealing relation to the cavity 22. The V-ring 52 permits fluid flow from the inlet 34 into the chamber 50 but prevents flow from the chamber 50 back to the inlet. The fluid chamber 50 is thus filled by fluid past the ring 52. The V-ring is also a packing which applies the force of the primary piston to the chamber 50. The pressure in the chamber 50 is at first greater than the pressure on the piston 30 due to the smaller area at 53 exposed to the chamber.

The secondary piston 40 moves in response to the fluid pressure in the chamber 50 against a retraction spring 55 to compress this spring. The secondary piston 40 thus moves from an initial position where it is at rest against the plug 44 to a moved position, and the extent of the subsequent return movement of the secondary piston establishes a retraction gap for the primary piston 30. This return movement of the secondary piston 40 to the rest position is under the influence of the retraction spring 55 and effects the retraction of the primary piston 30 a proportionate amount due to the movement of fluid within the chamber 50.

The chamber 50 is vented back to the fluid pressure side of the primary piston 30 through differential pressure operated valve means which establishes a positive pressure differential in the chamber 50 upon the release of the hydraulic pressure. In this embodiment, the pressure responsive means includes the secondary piston 40 and a stem 56 formed on the plug 44 proportioned to be received within a cooperating shallow recess 57 formed in the secondary piston 40. A seal for the major portion of the movement of the piston 40 on the stem 56 is effected by an O-ring 58 received on the stem 56 in sealing relation to the piston 40 at the recess 57.

Communication between the chamber 50 and the fluid operating side of the primary piston 30 is effected when the secondary piston 40 is in the moved position by fluid flow past the O-ring 58 on the stem 56 and through an axial passageway 60 formed in the plug 44. In this manner fluid is released from the chamber 50 to provide for the continued movement of the primary piston as necessary to maintain the required braking force. During these conditions the pressure in the chamber 50 and the working pressure behind the primary piston are substantially balanced. The passageway 60 is sealed off by the ring 58 upon the return movement of the secondary piston 40 under the influence of the retraction spring 55.

In the operation of the embodiment of FIG. 1, hydraulic fluid under pressure is applied through the inlet 34 and acts upon the total exposed cross sectional area of the primary piston 30 to move it with the friction pad 23 into engagement with the adjacent surface of the disk 20. At the same time, the fluid trapped within the chamber 50, together with the fluid pressure exerted upon the piston 40 through the passageway 60, operates to depress the secondary piston to the moved position against the spring 55 to take up the retraction gap. If the hydraulic pressure is now released, the secondary piston 40 will be returned to its original or rest position and will operate to return the primary piston a distance equal to the retraction gap through the movement of the column of fluid in the chamber 50 acting upon the area of the primary piston exposed to this chamber. This area is defined in this embodiment by the difference in areas between the bore 48 and the primary piston at 53. The V-ring 52 prevents fluid flow out of the chamber 50 during the release of the pressure and during the return of the secondary piston 40 by the spring 55.

A more severe application of hydraulic pressure to the unit results in the continued movement of the primary piston 30 in the cavity 22 against the disk 20 by means of the escape of the fluid from the chamber 50 through the normally sealed-off passageway 56. In this manner the primary piston 30 takes up for wear in the lining and the elastic deflection of the housing sections under stress to maintain an application of force on the pads 23 and the disk 20.

However, upon release, the running clearance may otherwise be lost due to the return of the sections of the housing to their normal position, the growth of the disk and/or the lining due to heat, and other factors tending to affect the running clearance. This is avoided by means for automatically repositioning the primary piston to compensate for such conditions, resulting in an effective overtravel of the primary piston.

This is accomplished by having a secondary piston which has an effective area correlated to the fluid pressure in the chamber 50, and with the force of the spring 55 and with the operating pressures, so as to continue to hold the spring 55 compressed during the first portion of the release of the hydraulic pressure. The secondary piston is held in its moved position at first by the magnified force of the pressure on the back of the primary piston as applied to the chamber 50. The secondary and primary pistons upon partial release of pressure retract together or in unison by reason of the force exerted on the outer face of the primary piston due to the above factors affecting clearance. Thus, the primary piston retracts to a condition of zero clearance eliminating its overtravel and the fluid which was expelled from the chamber through the passageway 60 is replaced by fluid past the V-ring 52. Upon the further decay of pressure, the force of the spring 55 becomes effective to retract the secondary piston, closing off the chamber 50 at the O-ring 58, and retracting the primary piston through the displacement or movement of the column of fluid in the chamber 50 by the piston 40.

An advantage of this invention resides in the fact that a positive pressure in the chamber 50 is maintained after release by the spring 55 acting through the annular area 57', thus resisting the intrusion of dirt, moisture, or other foreign matter. Since there are no mechanical links, connections, or drag seats between the moving parts, the primary piston is automatically positionable into an infinite number of positions according to the requirements of the system without regard to the maintenance of a frictional value. Also, no part of the effective area of the primary piston is lost to the secondary piston. Flexibility in design is provided by correlating the portions of the primary and secondary pistons exposed to the fluid pressure to achieve a desired retracting movement of the primary piston with a given movement of the secondary piston.

The device of FIG. 2 is a modified form of the embodiment of FIG. 1, the principal difference residing in the pressure operated valve means which is formed independently of the secondary piston. In this embodiment, like reference numerals are applied to like parts corresponding to the embodiment of FIG. 1. The secondary piston 40' moves within an axial cavity 70 formed within the primary piston 30' and is retained by a retaining washer 71 and a snap ring 72. The pressure responsive means connected to the chamber 50 providing for the escape of fluid from the chamber to the fluid side of the primary piston 30' consists of a poppet valve 75 formed with a nylon head 76 threaded on a stem 77 which is held in the normally closed position by a spring 78. The valve 75 is mounted for movement in an axial opening formed within the primary piston 30' and opens upon the occurrence of the predetermined maximum pressure differential in the chamber 50 to provide for fluid flow from the chamber 50 back to the source or inlet 34.

The operation of the valve 75 is related to the operation of the secondary piston 40' so that it is not opened due to the back pressure of the spring 55 acting through the piston 40'. Thus, the piston 40' is in the moved position taking up the retraction gap before the valve 75 opens. The piston 30' moves to the left under the influence of the hydraulic pressure and, at the same time, the secondary piston 40' is depressed against spring 55 by the magnification of pressure within the chamber 50. Continued movement of the primary piston to the left in the force applying direction is effected by the opening of the valve 75 which permits the entrapped fluid to escape from the chamber 50 back to the source. Upon the release of the hydraulic pressure, the pressure will initially be sufficient to hold the piston 40' in the depressed position while the two pistons retract in unison to a condition of zero clearance until the spring 55 becomes operative to retract the primary piston through the retraction gap, as described above in cnnection with FIG. 1. During a portion of this time, the fluid released through the valve 75 is made up by flow past the V-ring 52.

The embodiment of FIG. 3 differs from that of FIGS. 1 and 2 principally in that each of the primary and secondary pistons have identical areas exposed to the fluid chamber so that the retraction movement of the secondary piston moves the primary piston through the movement of a column of fluid of fixed volume. The primary piston 100 is movable within a suitable opening 101 formed within the housing 102 and is sealed by an O-ring 105 carried by the primary piston. The opening 101 in the housing is closed by an end plate 106 sealed thereto by a ring 107 and retained by a snap ring 108.

The primary piston 100 is formed with an axial bore 110 within which a secondary piston 112 is movably received. The piston 112 forms a seal with the primary piston at an O-ring 113 carried on an enlarged shoulder portion 115.

A fluid chamber 120 is formed between the primary and secondary pistons, and one-way valve means for admitting fluid under pressure to the chamber 120 includes an inwardly extending foot portion 121 formed of the primary piston which carries a V-ring 122 arranged to admit fluid under pressure into the chamber 120 from the inlet 125 but to prevent fluid flow out of this chamber.

The end plate 106 is recessed at 126 to receive the head 127 of a bolt 130. The bolt is threaded into the secondary piston 112 and moves with the piston to compress a retraction spring 131 through a retraction gap 132 defined between the head 127 and a spring retaining washer 134. The washer 134 and the bolt 130 are held within the recess 126 for limited axial movement by a snap ring 135.

Pressure operated valve means for venting the chamber 120 to the fluid pressure of the primary piston 100 includes a radial passageway 138 formed in the primary piston communicating to a ball check valve 140 carried within the secondary piston. The ball valve 140 is retained on its seat by a spring 141 and in turn communicates to an axial opening 142 formed within the bolt 130.

In the operation of this embodiment, the fluid pressure moves the primary piston 100 to the left in the housing 102 and, at the same time, a magnified force is transmitted through the chamber 120 by reason of the difference in areas of the primary piston exposed to the fluid pressure at the inlet 125 and at the chamber 120. The pressure in the chamber 120 causes the secondary piston 112 to move with the primary piston until the retraction gap 132 is taken up by the compression of the retraction spring 131 by the head 127. Continued movement of the primary piston 100 is effected by the opening of the ball valve 140 which permits fluid trapped within the chamber 120 to escape through the passageways 138 and 140 to the fluid pressure side of the primary piston 100. Upon the initial release of the hydraulic pressure, the secondary piston 112 will be held by the pressure in the chamber 120 thus holding the spring 131 in the compressed condition. The primary piston 130 thus may retract relatively to the secondary piston to a position of zero clearance and, upon further decay of the pressure, the retraction spring 131 becomes effective to retract the primary piston 100 through the entrapped column of fluid in the chamber 120.

The embodiment of the invention shown in FIG. 4 is similar to that described in connection with FIG. 3 except that the function and position of certain of the parts are reversed. It will be noted from an examination of FIG. 4 that the housing 102 and the parts associated with the secondary piston 112 are the same as those previously described in connection with FIG. 3. However, a primary piston 100' is formed with the recess 126' within which the head of the bolt 127 is received. The secondary piston 112 is arranged to move within the housing or the backing plate 106' connected to the housing by the snap ring 108 and sealed thereto by the O-ring 107. The backing plate 106' forms with the secondary piston 112 a fluid chamber 120', and one way valve means for admitting fluid under pressure to the chamber 120' consists of the V-ring 122 carried in the housing 106'.

Again, as in FIG. 3, the ball valve 140 is arranged to provide for fluid flow from the chamber 120' to the fluid pressure side of the primary piston through the passageways 138 and 142. The retraction spring 131 is arranged with the head 127 to define a retraction gap 132 within the recess 126' in the manner described in connection with FIG. 3.

In the operation of the embodiment of the invention shown in FIG. 4, fluid under pressure is admitted to the area between the backing plate 106' and the primary piston 100' through the inlet 125. This fluid pressure is also communicated to the chamber 120' through the V-ring 122, which operates to prevent the secondary piston 112 from moving to the left with the primary piston 100'. Thus, the piston 100' moves to compress the retraction ring 131 through the retraction gap 132. If further movement of the piston 100' is required in order to maintain the desired force, this results in the movement of the secondary piston 112 by the escape of fluid from the chamber 120' through the check valve 140.

Upon the release of the hydraulic pressure at the inlet 125, the primary and secondary pistons will first retract together to a position of zero clearance. During this time, the pressure in the chamber 120' will initially be sufficient to hold the head 127 compressed against the spring 131. However, upon the further decay of fluid pressure, the retraction spring 131 becomes effective to retract the primary piston 100 through the retraction gap 132.

This embodiment shows that it is immaterial to this invention whether the secondary piston is arranged to move within an element fixed to the housing, such as an end plate 106', or whether the secondary piston is arranged to move within the primary piston as shown in the embodiments of FIGS. 1–3. An advantage of the arrangement of FIG. 4 is that, when installed for use in hydraulic brakes, the condition of the lining may be observed by noting the depth to which the secondary piston 112 has moved within the end plate 106'.

The embodiment of FIG. 5 is particularly adapted for applying a force on a draw bolt such as may be employed in external contracting brakes and certain types of disk brakes, and includes a housing 150 having a fluid inlet 151 for applying hydraulic pressure to a primary piston 152. The piston 152 is movably positioned within an opening 155 formed in the housing 150 and includes a rearward extension 156 which passes through a suitable opening formed in the back wall 158 of the housing 150. The extension 156 forms a seal with the back wall 158 at an O-ring 159 and a packing gland 160.

A draw bolt 162 includes a head 163 formed with a spherical seat 165 received on the opposite side of the primary piston 152 for movement with this piston upon the application of hydraulic pressure through the inlet 151. In this embodiment, the bolt 162 becomes the principal force applying agent of the unit. A dust cover 166 protects the interior of the unit against the intrusion of foreign matter.

The secondary piston of this embodiment consists of a ring 170 slidably received between the primary piston 152 and the housing 150, and is subject to the pressure in a fluid chamber 172 formed as an annular space between the primary piston 152 and the housing 150. An O-ring 171 adjacent the secondary piston 170 forms a fluid seal and permits the piston 170 to run dry. The retraction spring of this embodiment consists of a wavy washer 175 (FIG. 7) adjacent the piston 170 and retained in the opening 155 by a snap ring 176. The ring 176 is proportioned so as not to interfere with the outward movement of the primary piston 152.

One way valve means providing for fluid flow from the inlet 151 into the chamber 172 consists of a V-ring 180 carried by the piston 152 for movement in the space defining the chamber 172. Pressure operated valve means arranged to provide for fluid flow from the chamber 172 to the fluid pressure side of the primary piston 152 includes a circle spring 182 (FIG. 6) which has a loop formed on an end thereof on which is received a nylon ball 184. The spring 182 is fitted within a cooperating groove 185 formed in the primary piston 152 and holds the ball 184 into closing relation over a passageway 188 formed in the primary piston between the chamber 172 and the fluid pressure side of the piston.

The operation of the embodiment of the invention shown in FIG. 5 is similar to that previously described in connection with FIGS. 3 and 4. Fluid pressure is admitted to the space behind the primary piston 152 through the fluid inlet 151. The primary piston 152 thus moves to the left and carries with it the draw bolt 162 for the application of force according to the intended use of the invention. The secondary piston 170 moves with the primary piston 152 to the left to compress the retraction spring 175, under the influence of the pressure within the chamber 172 as transmitted by the O-ring 171.

Continued movement of the primary piston 152, as may be required to maintain the desired force, is affected by the escape of fluid pressure from the chamber 172 through the passageway 188 past the nylon ball valve 184. The pressure in the chamber 172 thus established is sufficient to hold the secondary piston 170 in compressed relation against the retraction spring 175 thus taking up the retraction gap. Therefore, upon the release of the pressure at the inlet 151, this pressure is sufficient to cause the primary and secondary pistons to retract together to a condition of zero clearance. As the pressure at the inlet 151 further decreases, the pressure proportionately decreases within the chamber 172 to the point where the retraction spring 175 is effective to move the primary piston 152 in a retracting direction through the column of fluid trapped within the chamber 172.

It is therefore seen that this invention provides a forced application and retraction unit wherein a primary piston may be positioned, within limits, in an infinite number of positions to compensate for the wear of the components and their change of dimension due to heat and other causes. This is effected smoothly and accurately for each application of operating pressure to the inlet without the employment of a frictional connection or a drag seat defining the movement of the parts. The invention is adapted to a wide variety of physical arrangements including secondary pistons which are movable within primary pistons or which are movable within fixed body members. Also, a mechanical advantage of movement may be effected according to the embodiments of FIGS. 1 and 2 wherein a greater movement of the secondary piston results in a smaller movement of the primary piston. The fluid chamber through which the primary piston is retracted may be arranged between the relatively moving parts so that it, in effect, consists of a fluid column by means of which the retracting motion of the primary piston is coupled directly to retracting motion of the primary piston. The elimination of the drag seat results in the elimination of galling forces within the unit and provides greater freedom and choice in the selection of materials, as well as the elimination of wearing parts. This results in units of higher efficiency which are characterized by uniformity in retraction settings.

In each embodiment, the areas of the secondary pistons exposed to their fluid chambers and the forces of the retraction springs are correlated with the hydraulic fluid operating pressures in the chambers so that such pressures are effective during a portion of the release of the pressure source to hold the secondary pistons in the moved position while the primary pistons and related parts return to a condition of zero clearance. This assures that the units, when used as brake applicators, do not leave the brakes in a dragging condition, and obviates the necessity for "pumping" the brakes to reestablish running clearance lost to the overtravel of the primary pistons.

This can be best illustrated by way of specific example. This example is in no way intended as a limitation but is merely exemplary of the application of the teachings of this invention to a specific embodiment. The unit of FIG. 1 may contain a primary piston having an effective area of six square inches exposed to the hydraulic pressure through the inlet 34. The diameter of the primary piston 30 (and therefore area) is determined from a consideration of the maximum pressure which is available from a master cylinder, the capacity of such cylinder, and the force which is to be placed on the pad of friction material.

The secondary piston 40 may have an area at 57' exposed to the chamber 50 in the order of 0.6 square inch taken with a retraction spring of 100–80 lbs. force. Therefore, the pressure in the chamber 50 necessary to depress the spring 55, and the approximate residual pressure within this chamber at the conclusion of an operating cycle, may be in the region of 80/.6 or 133 p.s.i.

The area of the primary piston exposed to the chamber 50 is determined in this embodiment by the difference in diameters at 53 between the diameter of the primary piston, and may be in the order of 0.5 square inch. As mentioned above, the area of the primary piston exposed to the chamber may be controlled, as desired.

In order to effect the full retraction, the spring force and the area 57' must be such as to overcome the internal friction of the parts and to create a pressure on the back side of the primary piston sufficient to overcome whatever residual fluid friction or back pressure there may be in the system, as may be caused by a check valve at the master cylinder, or otherwise.

The V-ring 52 forms a very efficient seal which holds the pressure in the chamber 50 thus providing for the multiplication of pressure. For instance, approximately 11 p.s.i. applied to the six square inches of the primary piston will effect the 133 lb. pressure in the chamber 50 to initiate the compression of the spring 55 by the secondary piston 40. Similarly, when the outside pressure is released, this residual pressure in the chamber will normally maintain a residual pressure in the area behind the primary piston and in the external connecting lines, thus reducing the tendency of vapor locking.

It is therefore seen that a relatively low pressure at the unit is effective to move the secondary piston 40 against the retraction spring 55. If overtravel or over adjustment has occurred, the secondary piston in the example is held by a pressure in the neighborhood of 166 p.s.i., which is well below the pressures of 600–1300 p.s.i. commonly available in hydraulic systems. Therefore, the brake members can reassume their normal relationship during the decay of the pressure from, say, 600 p.s.i. to 166 p.s.i. The fluid expelled from the chamber 50 during the overtravel is regained by flow past the V-ring as it moves inwardly with the primary piston. As the pressure drops further, the spring 55 then becomes effective to retract the primary piston by returning the secondary piston to its rest position shown.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. An automatic compensating force applying and retracting unit for the application of braking force to and the establishment of running clearance of a friction pad in a disk brake comprising, a housing, a primary piston movable in said housing in one direction to apply a braking force to said friction pad upon the application of fluid pressure thereto, a secondary piston movable relatively to said primary piston, means defining a fluid chamber between said primary and secondary pistons and variable in volume upon the relative movement of said pistons, a retraction spring positioned to be compressed by the movement of said secondary piston through an amount the fluid displacement of which is proportional to a retraction gap of said primary piston, means in said housing for admitting fluid pressure to said primary piston, one way valve means in said primary piston for admitting said fluid pressure into said chamber for effecting said movement of said secondary piston against said spring, additional valve means operable upon a predetermined pressure in said chamber greater than that imposed by said retraction spring operating through said secondary piston to release fluid from said chamber providing for the continued force applying movement of said primary piston, the area of said secondary piston exposed to said chamber being correlated with the force of said spring to maintain said spring compressed during an initial portion of the release of said fluid pressure providing for compensation for the overtravel of said primary piston by holding the said retraction gap until the substantial decay of pressure.

2. A hydraulic force application and retraction unit for the application of braking force to and the establishment of running clearance of a friction pad in a disk brake comprising a body, a primary piston axially movable in said body directly against said friction pad and defining with said body a hydraulic fluid pressure space, a secondary piston movable with respect to said primary piston and defining with said primary piston a fluid chamber of variable volume with each of said pistons having a relatively small area exposed to the fluid in said chamber with the relative movement of either of said pistons displacing fluid in said chamber, a retraction spring, means applying hydraulic fluid pressure to said space, said secondary piston being movable in a forward sense against said spring under the influence of displaced hydraulic fluid in said chamber caused by movement of said primary piston under the influence of hydraulic pressure in said space, said secondary piston being movable in a reverse sense under the influence of said spring to retract said primary piston through displacement of fluid in said fluid chamber, first valve means connecting said chamber to said space providing for the escape of fluid from said chamber subsequent to the compression of said retraction spring by said secondary piston, and further valve means opening into said space provided for the replacement of said displaced fluid in said chamber from said space upon the release of said hydraulic pressure proportionate to the extent of overtravel of said primary piston.

3. A hydraulic actuator, comprising a fixed housing, a primary piston movable in said housing to apply a force upon the application of a source of hydraulic fluid pressure thereto, a secondary piston in said housing having a smaller area than said primary piston, means defining a fluid chamber between said pistons, one way valve means connecting said chamber for fluid flow thereinto from said hydraulic fluid pressure source, pressure operated valve means connecting said chamber for discharge into said source upon a predetermined pressure differential therebetween, means providing for limited fluid displacing movement of said secondary piston in said chamber between a rest position establishing a retraction gap and moved position upon the initial movement of said primary piston, means biasing said secondary piston into said rest position, said secondary piston having an effective area exposed to hydraulic pressure in said chamber correlated with said biasing means so as to maintain said moved position during at least a portion of the initial movement of said primary piston in said housing with initial release of said hydraulic pressure, and said biasing means being operable upon the further release of said pressure to effect retracting movement of said secondary and primary pistons together to said rest position.

4. A hydraulic actuator, comprising a fixed housing, a primary piston movable in said housing to apply a force upon the application of a source of hydraulic fluid pressure thereto, a secondary piston in said housing having a smaller area than said primary piston, means in said housing defining a fluid chamber between said pistons, a V-ring carried on said primary piston and arranged to provide for fluid flow only into said chamber from said hydraulic fluid pressure source, pressure operated valve means connected to said chamber operable to provide for escape of fluid from said chamber to said source, means providing for limited fluid displacing movement of said secondary piston in said chamber between a rest position establishing a retraction gap and a moved position, means biasing said secondary piston to said rest position, said secondary piston having an effective area exposed to hydraulic fluid pressure in said chamber correlated with said biasing means so as to maintain said moved position during a portion of the release of said hydraulic pressure, and said biasing means being operable upon the further release of said pressure to effect movement of said secondary piston to said rest position and retracting movement of said primary piston through said fluid displacing movement of said secondary piston.

5. A hydraulic force applying and automatic retracting device comprising a housing, a first fluid pressure responsive member received in sealing relation to said housing and movable in a force applying sense upon the application of hydraulic fluid under pressure thereto, a second fluid pressure responsive member smaller in area than said first, means in said housing defining a hydraulic chamber between said first and second members with an area of each of said members exposed thereto, said second member being movable through hydraulic fluid pressure in said chamber upon the initial force applying movement of said first member by an amount proportionate to a retraction gap, pressure operated valve means connected to said chamber and arranged to provide for the escape of fluid from said chamber upon the continued force applying movement of said first member, a retraction spring applying a force on said second member to return said member to its original position upon the release of said hydraulic fluid pressure in a direction tending to displace fluid from said chamber to effect retracting movement of said first member, said second member having an area exposed to said chamber correlated with the force of said spring and said fluid pressure to maintain said moved position against the force of said spring during an initial portion of said release of pressure, and one way valve means in said first member arranged to open into said chamber providing for the return of fluid into said chamber to compensate for the overtravel of said first member during said portion of release.

6. An automatic compensating force applying and retracting unit for the application of braking force to and the establishment of running clearance of a friction pad in a disk brake comprising, a housing, a primary piston movable in said housing in one direction to apply a braking force to said pad upon the application of fluid pressure thereto and having means therein defining an axial bore, a secondary piston received in said bore and movable relatively to said primary piston, means defining a fluid chamber between said primary and secondary pistons and variable in volume upon the relative movement of said pistons, a retraction spring positioned to be compressed by the movement of said secondary piston through an amount proportional to a retraction gap of said primary piston, means in said housing for admitting fluid pressure to said primary piston, one way valve means in said primary piston for admitting said fluid pressure into said chamber for effecting said movement of said secondary piston against said spring, additional valve means arranged to open following substantial movement of said secondary piston against said retraction spring to release fluid from said chamber providing for the continued movement of said primary piston, the area of said secondary piston exposed to said chamber being correlated with the force of said spring to maintain said secondary piston in said moved position and the spring compressed during an initial portion of the release of said fluid pressure.

7. The unit of claim 6 wherein said additional valve means includes cooperating parts of said primary and secondary pistons.

8. The unit of claim 6 wherein said one way valve means comprises a V-ring carried in said primary piston and forming a peripheral closure to said fluid chamber.

References Cited in the file of this patent

UNITED STATES PATENTS

| | | |
|---|---|---|
| 2,513,015 | Fike | June 27, 1950 |
| 2,952,338 | Oswalt | Sept. 13, 1960 |